(12) United States Patent
Shirali

(10) Patent No.: US 7,209,522 B1
(45) Date of Patent: Apr. 24, 2007

(54) BLAST MIMO SIGNAL PROCESSING METHOD AND APPARATUS

(75) Inventor: Kedar Shirali, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 740 days.

(21) Appl. No.: 10/388,940

(22) Filed: Mar. 14, 2003

Related U.S. Application Data

(60) Provisional application No. 60/433,272, filed on Dec. 12, 2002.

(51) Int. Cl.
*H04B 15/00* (2006.01)

(52) U.S. Cl. ............ 375/285; 375/144; 375/148; 375/346; 379/416; 379/417; 700/53

(58) Field of Classification Search ......... 370/201, 370/268, 269, 335; 375/144, 146, 148, 150, 375/260, 285, 347; 379/417; 714/780; 455/452
See application file for complete search history.

(56) References Cited

U.S. PATENT DOCUMENTS

| | | | |
|---|---|---|---|
| 6,097,771 A | 8/2000 | Foschini | 375/346 |
| 6,219,341 B1 | 4/2001 | Varanasi | 370/252 |
| 6,314,147 B1 | 11/2001 | Liang et al. | 375/346 |
| 6,317,466 B1 | 11/2001 | Foschini et al. | 375/267 |
| 2002/0027985 A1* | 3/2002 | Rashid-Farrokhi | 379/417 |
| 2002/0051433 A1 | 5/2002 | Affes et al. | |
| 2002/0177447 A1* | 11/2002 | Walton et al. | 455/452 |

FOREIGN PATENT DOCUMENTS

| | | |
|---|---|---|
| EP | 1 255 369 A1 | 11/2002 |
| WO | WO 01/19013 A1 | 3/2001 |
| WO | WO 01/48944 A1 | 7/2001 |
| WO | WO 02/082683 A2 | 10/2002 |

OTHER PUBLICATIONS

Goldstein, J. Scott et al., "A Multistage Representation of the Wiener Filter Based on Orthogonal Projections", *IEEE Transactions on Information Theory*, vol. 44, No. 7, Nov. 1998, pp. 2943-2959.
"BLAST High-Level Overview", *Bell Laboratories*, copyright Lucent Technologies 2000, 2 pages.
Honig, Michael L and Weimin Xiao, "Performance of Reduced-Rank Linear Interference Suppression", *IEEE Transactions on Information Theory*, vol. 47, No. 5, Jul. 2001, pp. 1928-1946.

(Continued)

*Primary Examiner*—Mohammad Ghayour
*Assistant Examiner*—Adolf DSouza

(57) ABSTRACT

A technique for generating a demodulation ordering used in receive signal processing operations in a BLAST MIMO receiver that is based on a relative comparison of near-to-far resistance measures among vectors forming the estimated channel transfer function matrix is disclosed. This near-to-far resistance comparison provides a resulting demodulation ordering believed equivalent to that provided by conventional V-BLAST techniques without requiring computation of the pseudoinverse of the estimated channel matrix. Also disclosed is a successive interference cancellation technique which employs Multi-Staged Nested Weiner Filtering (MSNWF) to recover soft estimates of the transmitted component-symbols from the vector observed at the BLAST MIMO receiver. Employing such MSNWF estimation is believed advantageous in that it avoids the need for matrix inversion operations involving the estimated channel matrix, Covariance Level Order Recursive-MSNWF (MSNWF-COR) or MSNWF Conjugate Gradient techniques may be conveniently implemented to provide the desired MSNWF estimation.

59 Claims, 9 Drawing Sheets

OTHER PUBLICATIONS

Golden, G. D. et al., "V-BLAST: A High Capacity Space-Time Architecture for the Rich-Scattering Wireless Channel", *Wireless Communications Research Department—Bell Laboratories Lucent Technologies* Holmdel, NJ, 18 pages.

Zoltowski, Michael D. et al., "On the Relationship Between Multi-Stage Nested Wiener Filter and Conjugate-Gradient Based Optimization", *supported by the Communications, Signal Processing, and Surveillance Program of the Air Force Office of Scientific Research*, under Grant No. F49620-00-1-0127, 13 pages.

Foschini, G.J. and M.J. Gans, "On Limits of Wireless Communications in a Fading Environment when Using Multiple Antennas", *Wireless Personal Communications*, 6: 311-355, 1998.

Golden, G.D. et al., "Detection algorithm and initial laboratory results using V-BLAST space-time communication architecture", *Electronic Letters*, vol. 35, No. 1, Jan. 1999, 2 pages.

Wolniansky et al., "V-BLAST: An Architecture for Realizing Very High Data Rates Over the Rich-Scattering Wireless Channel", invited paper, *Proc. ISSSE-98*, Pisa, Italy, Sep. 29, 1998.

Foschini, G.J., "Layered Space-Time Architecture for Wireless Communication in a Fading Environment When Using Multiple Antennas", *Bell Lab Technical Journal*, vol. 1, No. 2, Autumn 1996.

\* cited by examiner

BLAST MIMO SIGNAL PROCESSING METHOD AND APPARATUS

RELATED APPLICATION

This application claims priority benefit under 35 U.S.C. § 119(e)(1) of and incorporates by reference U.S. Provisional Application No. 60/433,272, filed on Dec. 12, 2002, entitled "A COMPUTATIONALLY EFFICIENT ARCHITECTURE FOR LAYERED-MMSE EQUALIZER FOR MULTIUSER COMMUNICATIONS", which is incorporated herein fully by reference.

TECHNICAL FIELD

This invention is generally directed to communications, and is more particularly concerned with observed signal processing in Bell Labs Layered Space-Time or BLAST type Multiple Input Multiple Output (MIMO) communications.

BACKGROUND OF THE INVENTION

Multiple Input Multiple Output (MIMO) systems are becoming popular in wireless and wireline communications to leverage aspects of intersymbol interference to potentially increase the bandwidth efficiency of existing spectra. In the case of wireless systems, radio waves do not propagate simply from transmit antenna to receive antenna, but bounce and scatter randomly off objects in the environment. This scattering is known as multipath, as it results in multiple copies or images of the transmitted signal arriving at the receiver via different scattered paths. In conventional wireless systems, multipath represents a significant impediment to accurate transmission, because the images can arrive at the receiver at slightly different times, causing destructive intersymbol interference and leading to corruption or loss of the information borne by these images.

Using the BLAST MIMO wireless approach first proposed by G. J. Foschini in 1996, however, it is possible to exploit multipath, in that the scattering characteristics of the propagation environment are leveraged to enhance, rather than degrade, transmission accuracy. See G. J. Foschini, "Layered Space-Time Architecture for Wireless Communication in a Fading Environment When Using Multiple Antennas", *Bell Lab Technical Journal*, Vol. 1, No. 2, Autumn 1996. This is done by treating multiple scattering paths as separate parallel subchannels, each capable of bearing distinct data. As proposed by Dr. Foschini, BLAST operates by splitting a discrete outbound datastream into multiple substreams and using an array of transmitter antennas to simultaneously launch the parallel substreams. All the substreams are transmitted in the same frequency band, so spectrum is efficiently utilized. Since the outbound data is being sent in parallel over multiple antennas, the effective transmission rate is increased in approximate proportion to the number of transmitter antennas used.

Another array of antennas is used to pick up the multiple transmitted substreams and their scattered images at the BLAST receiver. Each receive antenna picks up all of the incident transmitted substreams superimposed as observed components of the received signal vector, not separately. However, if the multipath scattering is sufficiently rich, then the multiple substreams are all scattered slightly differently, since they originate from different transmit antennas that are located at different points in space. These scattering differences allow the substreams to be identified and recovered from the observed components of the received signal vector.

In particular, the BLAST receiver signal processor(s) view the observed component signals constituting the received signal from all the receiver antennas simultaneously, first extracting the strongest substream, then proceeding with the remaining weaker signals, which are easier to recover once the stronger signals have been removed as a source of interference. Again, the ability to separate the substreams depends on the slight differences in the way the different substreams propagate through the environment. Thus, through BLAST, a multipath wireless channel is capable of bearing an enormous capacity of recoverable information, particularly in rich multipath scattering environments.

In Dr. Foschini' original proposal, now known as diagonal BLAST or D-BLAST, enormous transmission capacities are realized through combining multi-element transmit and receive antenna arrays with an elegant diagonally layered inter-substream coding structure in which coded information blocks are dispersed across diagonals in space-time (known as space-time codes). In theory, this architecture permits transmission rates to grow linearly with the number of transmit antennas used (assuming $M_T$ transmit antennas and $M_R$ receive antennas, where $M_T = M_R$) and can approach 90% of Shannon capacity. However, the complexities involved in implementing D-BLAST space-time coding currently limits its use to situations where maximum spectral efficiency is required, without regard for transceiver complexity or cost.

A simpler version of D-BLAST called vertical BLAST or V-BLAST has therefore been proposed by Dr. Foschini and colleagues at Bell Labs. See, e.g. P. W. Wolniansky et al., "V-BLAST: An Architecture for Realizing Very High Data Rates Over the Rich-Scattering Wireless Channel", invited paper, *Proc. ISSSE*-98, Pisa, Italy, Sep. 29, 1998. Like D-BLAST and BLAST techniques generally, the outbound datastream is split into plural substreams and transmitted in parallel across plural transmitter antennas. However, unlike D-BLAST, no inter-substream space-time coding is performed, resulting in a much simpler and practical vector encoding process for the outbound datastream. Instead, an individual QAM transmitter-antenna pair is provided for transmitting each substream (MT transmitters total), and each substream is symbol encoded independently of the other substreams. These transmitters may be collectively thought of as a vector-valued transmitter, where components of each transmitted MT×1 column vector are symbols drawn from e.g. a QAM constellation. MR receive antennas are used, where MT≦MR.

V-BLAST's lack of inter-substream space-time coding and associated redundancy benefits does reduce the spectral efficiencies compared to D-BLAST. Nevertheless, where MT≦MR and channel conditions result in "rich scattering", the V-BLAST architecture similarly offers capacity increases which progress approximately linearly with increases in the number of deployed transmitter-antenna pairs.

The secret behind V-BLAST lies in the use of successive interference cancellation demodulation techniques at the receiver, similar to those employed in multi-user communication systems like DS-CDMA. The observed datastream at the receiver, which is composed of the superposition of the $M_T$ transmitted substreams, can be demodulated through successive interference cancellation and nulling to recover all the transmitted substreams. Proper demodulation and recovery of the transmitted datastream hinges critically in being able to determine the proper order in which the transmitted substreams should be demodulated. Described more fully in Foschini, such optimal substream ordering involves selecting the remaining substream with the best signal-to-noise ratio as the demodulation candidate at each iteration of the demodulation process.

As such, this form of V-BLAST demodulation, known as zero-forcing substream detection, is similar to zero-forcing decision feedback equalization (ZF-DFE). Accordingly, it is similarly effected by the noise-enhancement problem observed in zero-forcing equalizers as well as the error propagation problems characterized by decision feedback equalizers, as is well known in the art. Because of these drawbacks, recursive minimum mean-squared error estimation (MMSE) substream detection, based on MMSE decision feedback equalization used in adaptive antenna arrays, has been instead been proposed and utilized in a number of V-BLAST implementations in order to address the limitations of the zero-forcing techniques, including noise enhancement issues. See e.g. Wolniansky, and also G. D. Golden et al., "Detection algorithm and initial laboratory results using V-BLAST space-time communication architecture", *Electronic Letters*, Vol. 35, No. 1, January 1999. However, regardless of whether V-BLAST zero-forcing or MMSE substream detection is used, a computation of the Moore-Penrose pseudo-inverse of a successively deflating or decomposing matrix channel transfer function H is required for each parallel substream. Moreover, pseudo-inverse matrix computation (or simply "matrix inversion") is required to initiate optimal substream ordering per datastream.

It should be appreciated that matrix inversion is a computationally complex and expensive operation and therefore not very attractive to implement though hardware, including application specific integrated circuits (ASICs).

In the past few years, research has been initiated in generally developing MMSE solutions which are computationally less complex and avoid the need for matrix inversion operations. This research started with the seminal paper on Multi-staged Nested Weiner Filters (MSNWF) by Goldstein, Reed and Scharf (J. S. Goldstein et al., "A Multistage Representation of the Weiner Filter Based on Orthogonal Projections", *IEEE Transactions on Information Theory*, Vol. 44, No. 7, November 1998, incorporated herein fully by reference). This paper revealed a novel interpretation of the Weiner-Hopf solution was revealed, along with an inversion free method for computing the same. While the motivation behind this work was to design simple reduced rank estimators, the idea has since been detailed in M. L. Honig et al., "Performance of Reduced-Rank Linear Interference Suppression", *IEEE Transactions on Information Theory*, Vol. 47, No. 5, July 2001, also incorporated herein fully by reference, which proposes a simplified MMSE demodulator for DS-CDMA based downlinks. Therefore, it would be desirable to develop matrix inversion-free demodulation techniques for BLAST and other types of MIMO communications systems.

SUMMARY OF THE INVENTION

In accordance with these and related desires, an aspect of the present invention is directed to generating a demodulation ordering used in receive signal processing operations in a BLAST MIMO receiver. This demodulation ordering is based on a relative comparison of near-to-far resistance measures among vectors forming the estimated channel transfer function matrix for the BLAST MIMO communications system including such receiver. This near-to-far resistance comparison results in a demodulation ordering equivalent to that provided by conventional V-BLAST techniques without the need for computing of the pseudoinverse of the estimated channel matrix.

Another aspect of the present invention is directed to successive interference cancellation which employs Multi-Staged Nested Weiner Filtering (MSNWF) to recover soft estimates of the transmitted component-symbols from the vector observed at the BLAST MIMO receiver. Employing MSNWF estimation consistent with this aspect of the present invention is believed advantageous in that it avoids the need for matrix inversion operations involving the estimated channel matrix. Consistent with the disclosed embodiments, Covariance Level Order Recursive-MSNWF (MSNWF-COR) or MSNWF Conjugate Gradient techniques may be conveniently employed in this MSNWF estimation.

Additional aspects and advantages of this invention will be apparent from the following detailed description of one or more embodiments, which proceeds with reference to the accompanying drawings.

DETAILED DESCRIPTION

Figure 6:
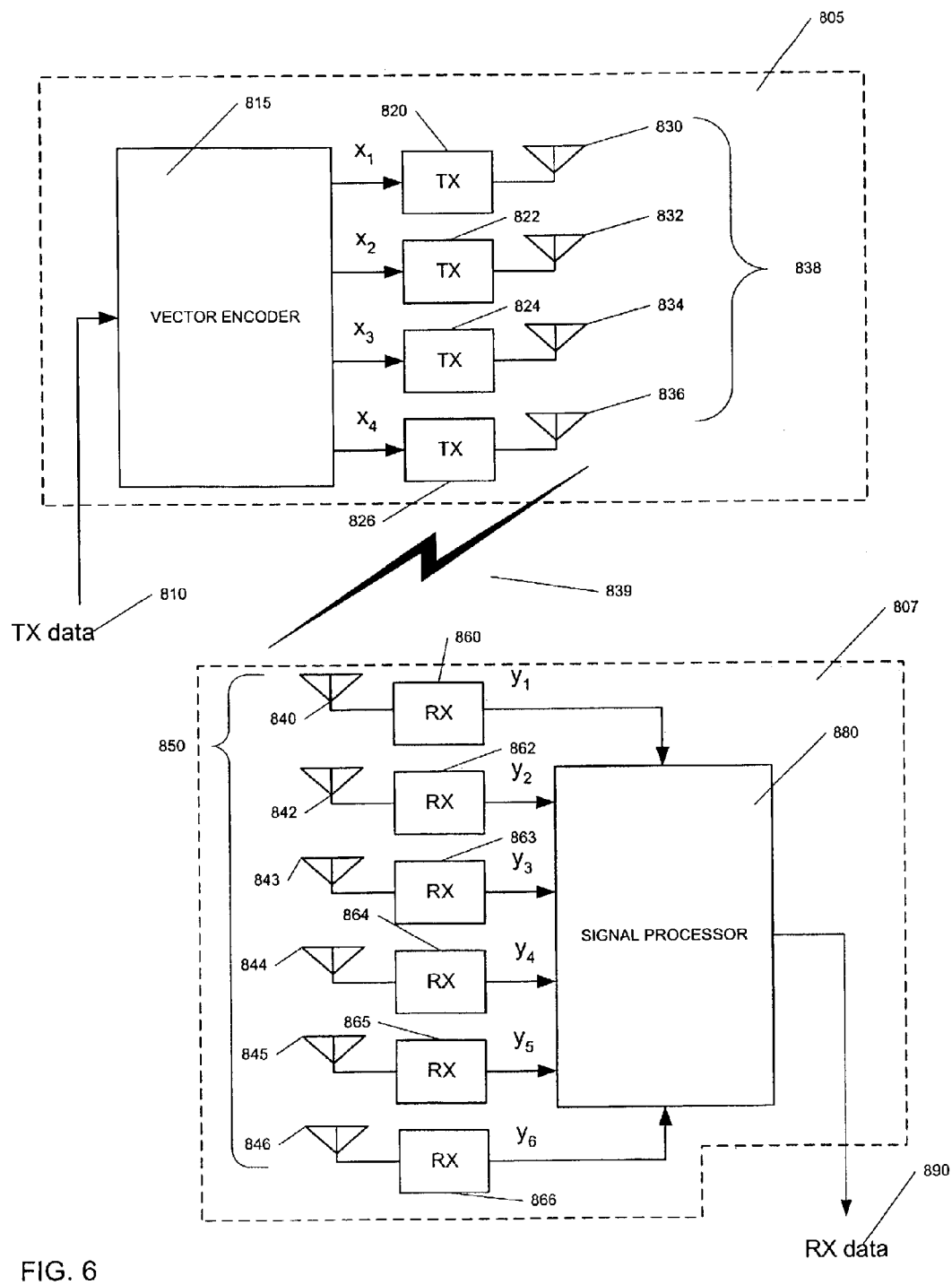
FIG. 6 is a block diagram illustrating a BLAST MIMO communications system according to an embodiment of the present invention.

A high level block diagram of a MR=6, MT=4 BLAST MIMO communication system according to an embodiment of the present invention is shown in FIG. 6. This communication system includes BLAST transmitter unit 805 and BLAST receiver unit 807. As with known BLAST systems, the capacity of the BLAST MIMO communication system shown in FIG. 6 is dependent on the number of transmit antennas being utilized. However, it should be realized that this number (four) shown here has been selected for illustration purposes only and in fact any combination of transmitter-antenna and receiver-antenna-pairs may be exploited without departing from the scope of the present invention as long as the number of receive antennas is at least equal to the number of transmit antennas being used for a given communications link.

The BLAST transmitter unit 805 is generally similar in configuration and operation to a conventional V-BLAST transmitter. As such, a single discreet datastream 810 is demultiplexed into $M_T$ substreams, and each substream is individually symbol encoded. Both of these operations are performed by the vector encoder 815. The substreams can be encoded using a variety of known symbol formats, including such OFDM as BPSK, QPSK, and QAM constellations of varying size, including 16, 64 and 256 symbol constellations. The resulting substream symbols ($x_1 \ldots x_4$), forming the components of the transmitted column vector symbol x are then fed to its corresponding transmitter-antenna pair for upconversion and transmission across a preferably richly scattering propagation environment. Accordingly, $x_1 \ldots x_4$ may be referred to here as component-symbols of the transmitted vector symbol x. For example, $x_1$ would be fed to QAM transmitter 820 and then radiated from antenna 830 coupled thereto. Likewise symbol $x_2$ would be fed into transmitter 822 and radiated from antenna 832 coupled thereto. It should be noted that transmitters 820, 822, 824 and 826 (and generally all transmitters of the BLAST system) operate co-channel at symbol rate 1/T symbols a second with synchronized symbol timing. Though not required, in this embodiment the same symbol constellation is used for each substream and that transmissions are organized into bursts of L symbols. The power launched by each transmitter is proportional to $1/M_T$ so that the total radiated power is constant and independent of $M_T$. Antenna 830, 832, 834 and 836 collectively form the antenna array 838 of the BLAST transmitter unit 805.

Turning now to the BLAST receiver unit 807, six individual receiver antenna pairs are provided. Each of the receivers 860, 862 . . . 866 are, individually, a conventional SISO (Single Input Single Output) symbol receiver such as a QAM receiver. These receivers also operate co-channel, each receiving the signals radiated from all $M_T$ transmit antennas (i.e., from the antenna array 838 as shown in FIG. 6). The receiver antennas 840, 842, . . . , 846 may be collectively referred to as the receiver antenna array 850 of the BLAST receiver unit 807.

Once received, the observed, randomly superimposed components of the received vector signal Y recovered by each receiver 860 . . . to 866 ($y_1 \ldots y_6$) are then sent to the signal processor 880 of the BLAST receiver unit 807 where an estimate of the originally transmitted component-symbols $\hat{x}_1 \ldots \hat{x}_4$ (generally denoted as $\hat{x}_{ord-n}$ in the figures) forming the transmitted symbol vector $\hat{x}$ are recovered, symbol decoded, and the resulting substreams reassembled to form an estimate (RX data 890) datastream of the transmitted datastream (TX data 810). As is more clearly shown in FIG. 7, the signal processor 880 includes a transmitted component-symbol ordering unit 910 and a successive interference canceller 920, having simultaneous access to all observed components $y_1 \ldots y_6$. The ordering unit 910–920 canceller 920 tandem is used to recover a likely estimate of the transmitted symbol vector $\hat{x}$, on a estimated component-symbol by component-symbol basis, as will be discussed in greater detail below. A conventional symbol decoder, such as a QAM symbol decoder 930 may be used to decode each estimated component-symbol ($\hat{x}_1 \ldots \hat{x}_4$) forming $\hat{x}$ into a corresponding estimated substream, and then the substream multiplexor 940 is provided to reassemble the recovered substreams according to the sort order computed by the component-symbol ordering unit 910 into recovered datastream RX data 890. This is done to provide a reasonably accurate facsimile of the original datastream TX data 810 of interest.

A channel estimation unit 905 is also provided as part of the signal processor 880 to derive an estimate of the matrix channel transfer function $\hat{H}^{MR \times MT}$, in which a given component $\hat{h}_{ij}$ represents the complex transfer function from the transmitter i to the receiver j. As will be discussed in greater detail below, $\hat{H}^{MR \times MT}$ will be used by the transmitted component-symbol ordering unit 910 to determine the proper sort order Sort(.) for the burst of vector symbols bearing, at least in part, the transmitted datastream. Moreover, $\hat{H}^{MR \times MT}$ will be used by the successive interference canceller to obtain coefficients in applying MSNWF estimation according to the present embodiment. Finally, individual column vectors of $\hat{H}^{MR \times MT}$ will be used to decode corresponding estimated component-symbols recovered by the successive interference canceller 920.

Channel transfer function estimation, is, of course, necessary because the actual matrix channel transfer function $H^{MR \times MT}$ is unknown at the receiver 807. However, a number of known techniques may be used to estimate H accurately, using e.g. a training symbol sequence of known data embedded at the beginning of each burst. Indeed in the quasi stationary case in which the channel time variation is viewed as being negligible over the L symbol periods comprising a transmitter burst, and a flat-fading propagation environment is assumed, $\hat{H}$ approaches H. Therefore, so as not to obscure the teachings of the present invention, assume that the communications system shown in FIG. 6 operates under such conditions and that, therefore, the estimation unit 905 can estimate H perfectly ($\hat{H} \rightarrow H$).

Figure 7:
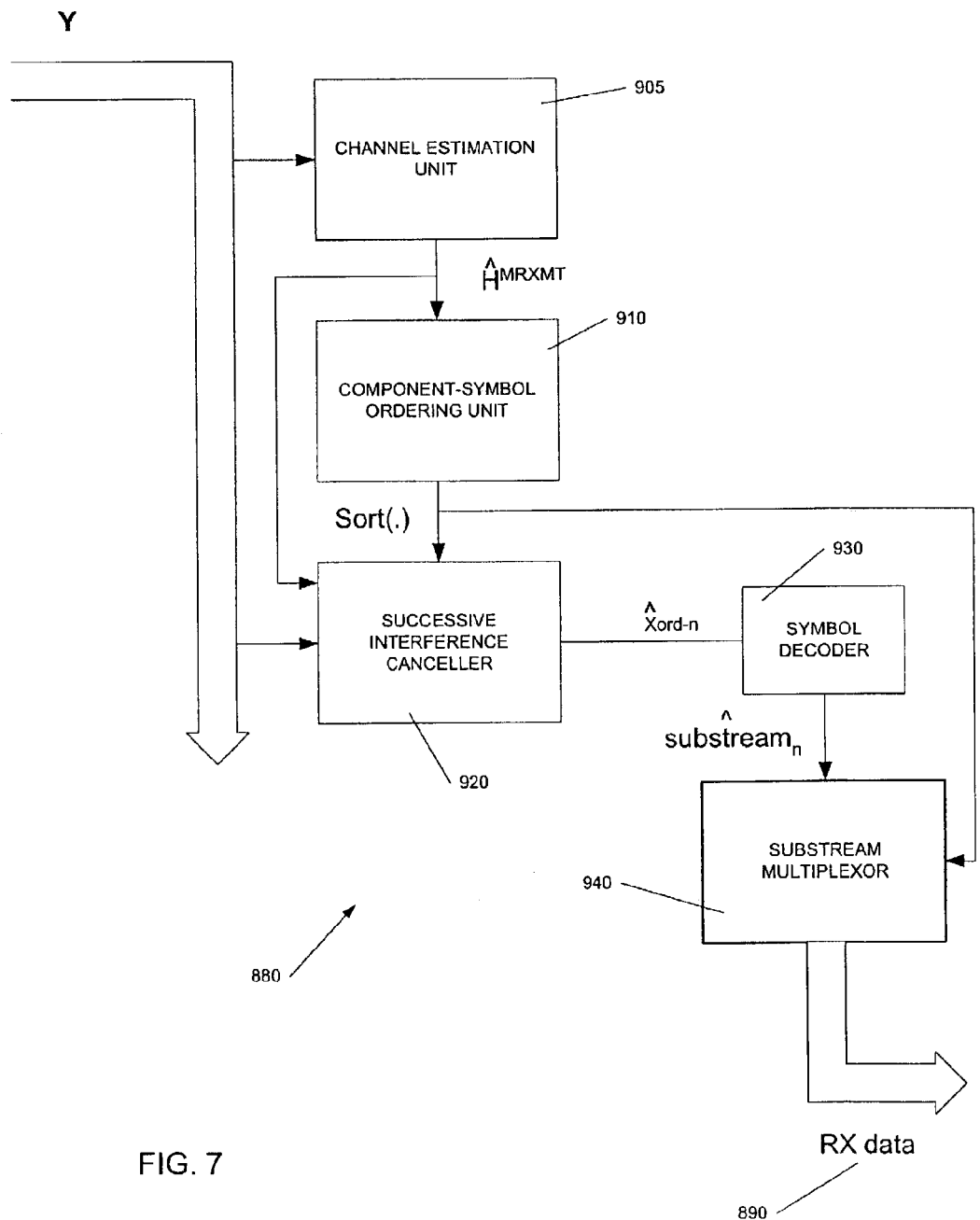
FIG. 7 is a block diagram illustrating the signal processor of FIG. 6 in more detail.

In the embodiment shown in FIGS. 6 and 7, the ordering unit 910 utilizes successive near-to-far resistance comparison among the MT column vectors $\hat{h}_0, \hat{h}_1, \ldots, \hat{h}_{MT-1}$ forming the estimated channel matrix $\hat{H}$ via a near-to-far resistance unit to optimally order the observed components for recovering the estimated component-symbols $\hat{x}_1 \ldots \hat{x}_{MT}$ through MMSE successive interference cancellation techniques. As will be discussed in more detail below, this technique avoids the need for determining a pseudo inverse of the estimated channel matrix $\hat{H}$. However, in other embodiments, other relative signal-to-noise ordering techniques may be interchangeably used, such as conventional V-BLAST signal ordering techniques.

Also, in the embodiment shown in FIGS. 6 and 7, the successive interference canceller 920 utilizes successive MSNWF estimation and interference cancellation as will be discussed below. In so doing, recursive matrix inversion is avoided. However, it should be noted that other MMSE or MMSE equivalent successive interference cancellation techniques may be alternatively and interchangeably employed as is known in the art, including the layered MMSE or zero-forcing processing set forth in Wolniansky article if the inclusion of matrix inversion operations are acceptable.

Observed component ordering according to an embodiment of the invention will now be detailed. The sorting or ordering algorithm undertaken by the component-symbol ordering unit 910 is adapted, in part, from algorithms which compute near-far resistance (NFR) measure calculations used in multiuser communications. Given N users in a multiuser system, each simultaneously transmitting a signal s, collectively resulting in the signal vector $s\{s_1, s_2, \ldots, s_N\}$, the NFR for a given $s_i$ is a measure of the signal to noise ratio (SNR) that can be achieved for $s_i$, independent of the power of its interferers which may constitute all or less than all of the remaining signals $\{s \backslash s_i\}$ (the notation $\{s \backslash s_i\}$ refers to the subset of s which includes all signals except for si, or alternatively, it means vector s decomposed by component $s_i$). Mathematically this is equivalent to determining the component of signal $s_i$ that is orthogonal to the interfering sub-space $G_i$ spanned by $\{s\backslash s_i\}$. The "stronger" this orthogonal component is, the more resistant signal $s_i$ is to multipath from the interferers. This component $s_i^*$ is easily found by subtracting from $s_i$ the projection of $s_i$ onto the sub-space Gi. This can be written as:

$$s_i^* = s_i - \langle s_i, G_j \rangle G_i \qquad (1)$$

To compute $G_i$, one can just start with the signal set or vector s and derive the orthogonal basis vectors for each $G_i$ using the well-known Gram-Schmidt orthogonalization or other suitable technique which generates a set of orthogonal basis vectors for $G_i$. $s_i^*$ can then be computed simply by using equation (1). Therefore, given set of N signals s, we compute the corresponding $s_i^*$ for each i, $1 \leq i \leq N$. The $s_i^*$ with the largest norm ($\max \|s_i^*\|$) will be the signal with the highest NFR and therefore the most robust to multiuser interference. Consistent with the present invention, upon determining the $s_i$ with the largest NFR ($s_k$), we can then assume that the interferer is cancelled and therefore repeat the above procedure for s-$\{s\backslash s_i\}$ This process proceeds recursively until s has only one component signal. In this way one can obtain ordered list of signals with descending order of NFR measures.

Figure 1:
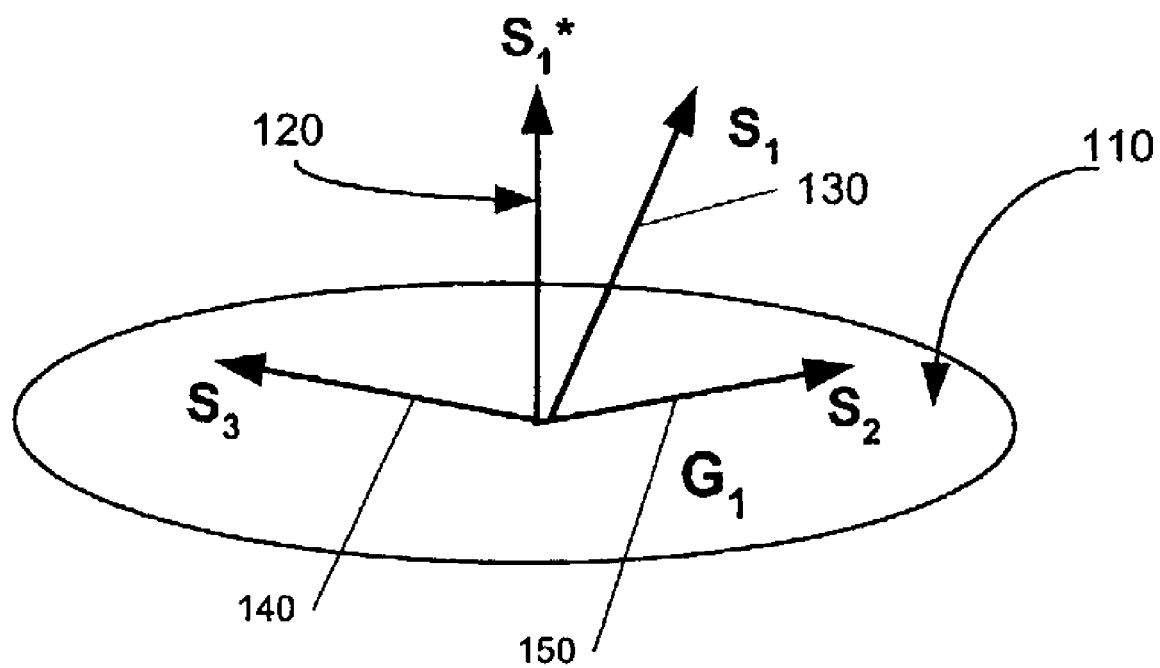
FIG. 1 conceptually illustrates near-far resistance ordering according to an embodiment of the invention.

FIG. 1 illustrates an iteration of this NFR calculation process graphically as 110, which is the subspace spanned by the signal vectors $s_2$ 150 and $s_3$ 140 of the three signal set $s\{s_1,s_2,s_3\}$. $s_1^*$ 120 is then computed using equation (1). The NFR measure may then be obtained for $s_1$ 130 as the 2-norm of $S_1^*$ (denoted as $\|s_1^*\|$). Note that the subspaces are then realized (not shown in FIG. 1) and the NFRs for $s_2$ and $s_3$ are likewise calculated. A comparison of the NFR values for $s_1$, $s_2$, and $s_3$ is then made, and the vector having the relatively highest NFR value is ordered first. If we assume that $s_1 = s_k$, then, in keeping with the above, s depletes to $\{s_2, s_3\}$, the subspace are again realized (this time without consideration of $s_1$). NFR values are again then calculated for $s_2$ and $s_3$, and the relative maximum of these is ordered second. Then, the remaining signal $s_2$ or $s_3$ would be ordered last.

Figure 2:
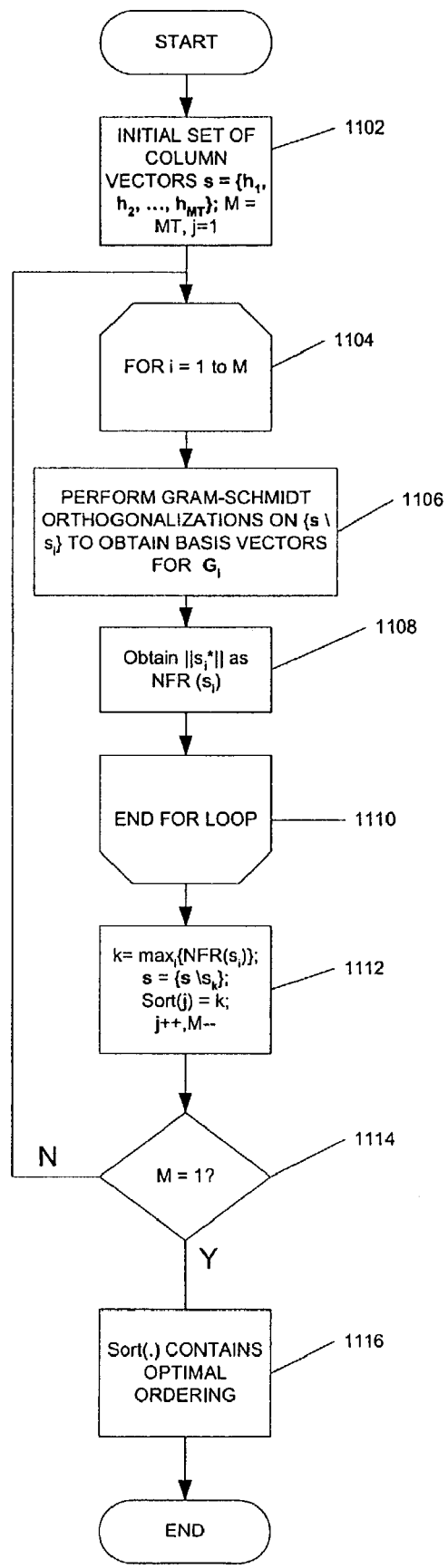
FIG. 2 is a flowchart illustrating demodulation order processing according to an embodiment of the invention.

This descending NFR ordering process is leveraged in the BLAST MIMO embodiments shown in FIGS. 6 and 7 to optimally order the detection and demodulation of the estimated component-symbols without the need for performing a matrix inversion operation. In so doing, the number of "signals" to order are determined by the number of transmitters (MT). Further, the signals to be ordered correspond to the column vectors $\hat{h}_0, \hat{h}_1, \ldots, \hat{h}_{MT-1}$ of the channel estimate matrix $\hat{H}$. Given these column vectors, the descending NFR ordering process follows the steps outlined in the flowchart of FIG. 2 and may be conveniently undertaken by the component-symbol ordering unit 910 shown in FIG. 7. The resulting array Sort(.), produced here by the comparison unit 915, references the column vectors of $\hat{H}$ in successively descending NFR strength, which the inventor has discovered provides the optimal demodulation order required in V-BLAST signal processing. In fact, the process outlined in FIG. 2 yields the same optimal ordering result as that provided by conventional V-Blast ordering, without the need to compute the inverse of the estimated channel matrix $\hat{H}$, or perform other inverse matrix operations.

The ordering unit 910 and comparison unit 915 may be conveniently implemented using a variety of hardware and/or software configurations depending on design considerations such as vector symbol transmission rate, expected propagation environment characteristics, and overall system complexity. As such configurations may include, but are certainly not limited to combinations incorporating one or more of discrete logic, application specific integrated circuitry, and/or programmed special-purpose or general purpose information processor(s), such as one or more programmable digital signal processors, microprocessors, or microcontrollers capable of accessing memory or other computer readable media containing program code causing such information processor(s) to execute the processing steps outlined in FIG. 2. Of course, a single information processor with sufficient resources can provide the functionality of the component-symbol ordering unit 910 in isolation, or in combination with other signal processing functions, such as successive interference cancellation and/or component-symbol decoding, as will be discussed in greater detail below.

Figure 8:
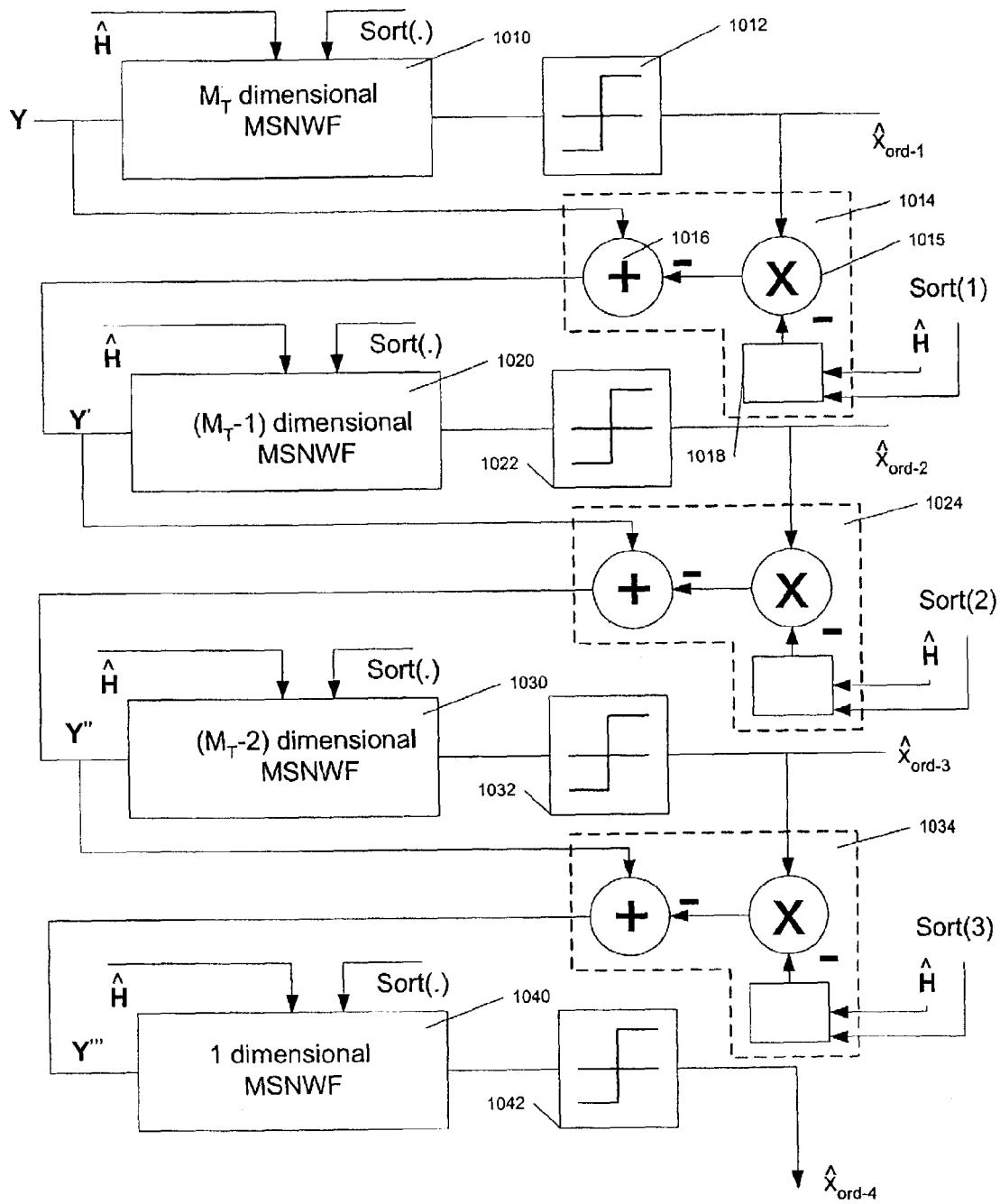
FIG. 8 is a block diagram schematically illustrating the successive interference canceller shown in FIG. 7.

Turning now to transmitted component-symbol estimation and successive interference cancellation consistent with the present invention, FIG. 8 illustrates a more detailed view of the successive interference canceller 920 deployed in the signal processor 880 shown in FIGS. 6 and 7. The interference canceller 920 is generally arranged here as an MT deep (with MT here=4) estimator-slicer-canceller cascade generally similar to conventional layered MMSE interference cancellers used in V-BLAST MIMO systems. Each individual estimator-slicer-canceller (such as estimator 1010 in series with slicer 1012 and cancellation unit 1014 can be thought of as a separate estimation and cancellation stage or unit within the larger cascade). However, unlike those systems, MultiStage Nested Werner Filters ("MSNWF") 1010, 1020, 1030 and 1040 configurable by estimated channel matrix $\hat{H}$ and the sorting ordering Sort(.) are used instead of conventional MMSE filters. As will be described in more detail below with reference to FIGS. 3, 4A and 4B, these MSNWFs provide soft decision estimation of the likely transmitted component-symbols $\hat{x}_1 \ldots \hat{x}_4$ sequentially in accordance with the sorting order Sort(.) without the need for computing any matrix inversions of the estimated channel matrix $\hat{H}$. As MSNWF 1010 must filter the entire observed vector Y, it includes an MT dimensional filterbank. MSNWF 1020 filters Y', which corresponds to Y without the strongest interferer estimated component-symbol $\hat{x}_{ord-1}$ (which was cancelled out of Y by cancellation unit 1014), and is therefore of dimension MT-1. Likewise, MSNWF 1030 filters Y"=Y'-$\hat{h}_{Sort(2)} \cdot \hat{x}_{ord-2}$ and thus is of MT-2 dimensions. MSNWF 1040 filters Y'''=Y''$_{Sort(3)} \cdot \hat{x}_{ord-3}$, and in this case (MT=4) comprises, a one-dimensional MSNWF filter.

Still referring to FIG. 8, a slicer 1012, 1022, 1032 and 1042 is provided coupled to the output of the MSNWFs 1010, 1020, 1030 and 1040 respectively to quantize the soft symbol-component decisions generated by the MSNWFs to enable ready symbol decoding by the symbol decoder 930 shown in FIG. 7. The cancellation units 1014, 1024, and 1034 in this embodiment each include a column vector selector unit (such as unit 1018) to select the column vector $\hat{h}_0, \hat{h}_1, \ldots, \hat{h}_{MT-1}$ corresponding to the estimated symbol-component just recovered using the Sort(.) parameter.

Note that in the embodiment shown in FIG. 8, the depth of the canceller cascade is 4 since MT=4 as shown in FIG. 6 (and so only four component-symbols corresponding to the four transmitted substreams need be recovered). However, it should be appreciated that the canceller 920, and the individual MSNWFs themselves, can be arranged to handle any number of transmitted component-symbols, as long as the number of receive antennae MR meet or exceed MT.

The MSNWF filters used in matrix inversion-free component-symbol estimation according to the embodiment shown in FIG. 8 will now be explored in more detail. In recent times, MSNWF has been proposed as a computationally simple method to approximate the MMSE solution. Therefore it makes sense to explore opportunities to suggest its application in areas where MMSE estimators are utilized. As discussed above, variants of V-BLAST MIMO systems utilize MMSE to demodulate the individual datastreams instead of the ZF-DFE approach proposed in Wolniansky. Layered MMSE combines the enhanced performance (lower noise enhancement issues than in zero-forcing algorithms) offered by MMSE with the proven benefits of successive interference cancellation. However the MMSE solution requires the computation of the pseudo inverse of the estimated channel matrix formed using the observation vector. MSNWF presents an attractive alternative to computing the approximate MMSE solution without the need for matrix inversion operations.

Given a BLAST MIMO system made up of MT transmit antennas and MR receive antennas (MR>=$M_T$) we can write the following simple model for the received observed vector Y, such that $$Y = Hx + N = h_0 \cdot x_0 + h_1 \cdot x_1 + \ldots + h_{MT-1} + N, \quad (2)$$

where x is the (MT×1) column vector $[x_0\ x_1\ x_2\ \ldots\ x_{MT-1}]^T$ of transmitted component-symbols, and Y is the (MR×1) column vector representing the observed components or received samples, N is the (MR×1) column vector representing the additive white Gaussian distributed noise with zero mean and variance $\sigma_n^2$. H is the channel transfer matrix made up of the column vectors $\{h_0, h_1, \ldots, h_{MT-1}\}$ described above. The MMSE estimator $W_{MMSE}$ for estimating X given observed vector Y and channel matrix H is given by the Weiner-Hopf equation:

$$W_{MMSE} = R_{yy}^{-1} R_{xy}, \quad (3)$$

where $R_{yy}$ is the correlation matrix formed using Y and $R_{xy}$ is the cross-correlation vector.

As suggested in Goldstein, Multistage Nested Weiner Filters provide an alternative approach to derive $W_{MMSE}$ that can be computed without the inversion of the correlation matrix. Besides, the 'nested' aspect of MSNWF presents an elegant method that breaks a higher dimensional problem recursively into lower dimensional sub-problems and then combines the solutions of each of these sub-problems to obtain the final solution. The MSNWF approach has been shown to be equivalent to finding the MMSE solution in the Krylov subspace formed by the vectors $\{b, Ab, A^2b, \ldots, A^{MT}b\}$ (see e.g. Honig).

Figure 3:
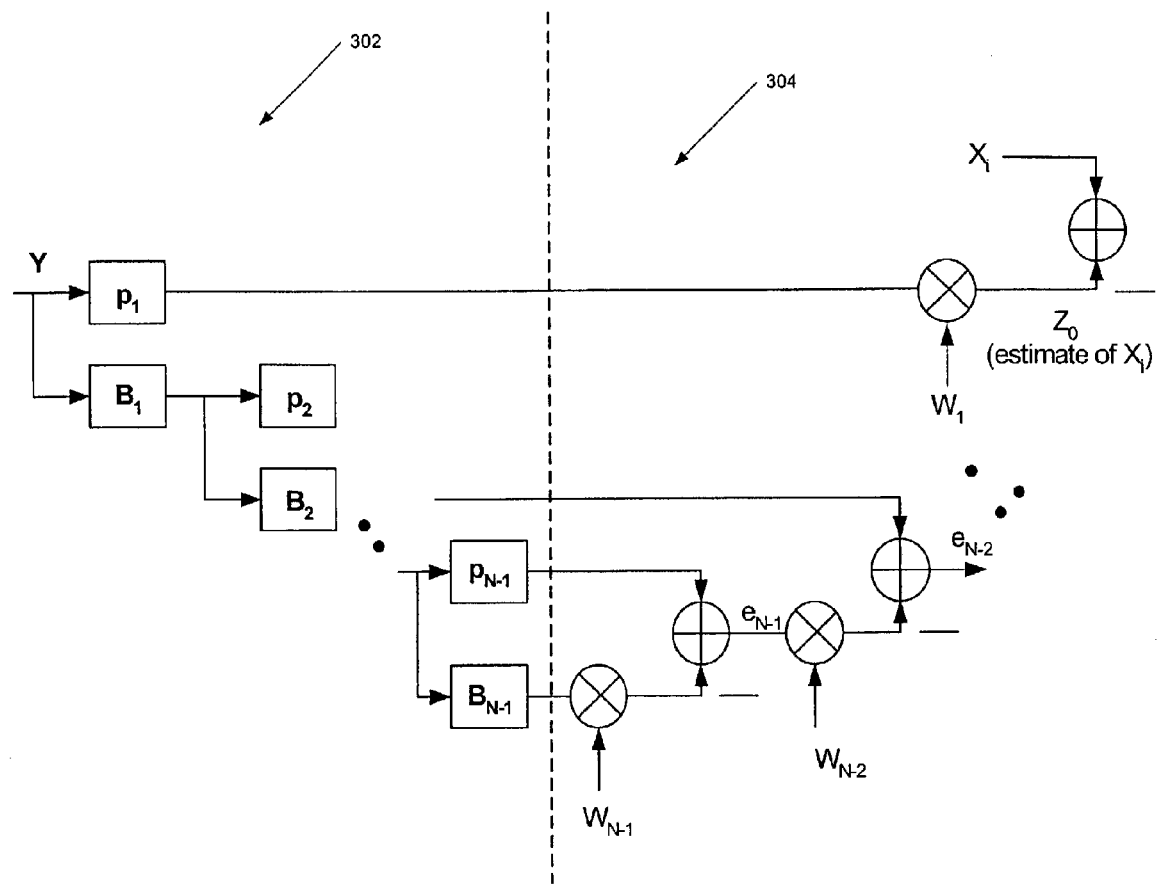
FIG. 3 is a block diagram schematically illustrating an MMSE equivalent MSNWF estimator according to an embodiment of the invention.

FIG. 3 illustrates the general configuration of an MSNWF filter as proposed by Goldstein and M. D. Zoltowski et al., "The Relationship Between Multi-Staged Nested Weiner Filter and Conjugate-Gradient Based Optimization", which is incorporated herein by reference. This filter includes an analysis section 302 used to break up a higher dimensional estimator into a sequence of lower dimensional estimators using forward recursion techniques, and a synthesis section 304 which combines the lower dimensional estimates using backward recursion to compute the final MMSE estimate. In FIG. 3, the notation $p_i$ refers to column vectors of N=MR dimension while each $B_i$ form blocking matrices of dimension (N−i)×N. Note that as the computations advance in the analysis section 302, Bi becomes progressively smaller (as i increases).

Figure 4A:
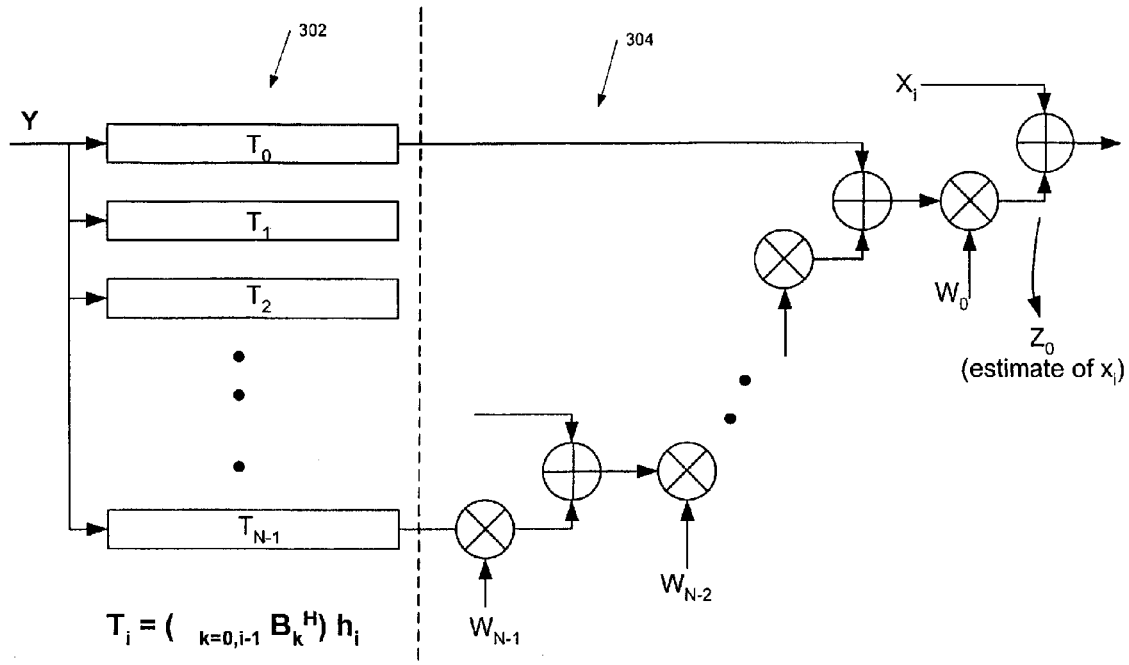
FIG. 4A is a block diagram schematically illustrating an MSNWF-COR estimator according to an embodiment of the invention.

With continuing reference to Zoltowski, the MSNWF estimator configuration shown in FIG. 3 can be modified to that shown in FIG. 4A, depicting a Covariance Level Order Recursive-MSNWF (COR-MSNWF) configuration of an MMSE equivalent estimator. In particular, in COR-MSNWF, the forwardly recursive analysis section shown in FIG. 3 is replaced by the analysis filterbank 402 to generate $T_0 \ldots T_{N-1}$, where $T_j$ is computed as follows:

$$T_j = (\Pi_{k=0, i=1} B_k \cdot H) h_i \quad (4)$$

Figure 4B:
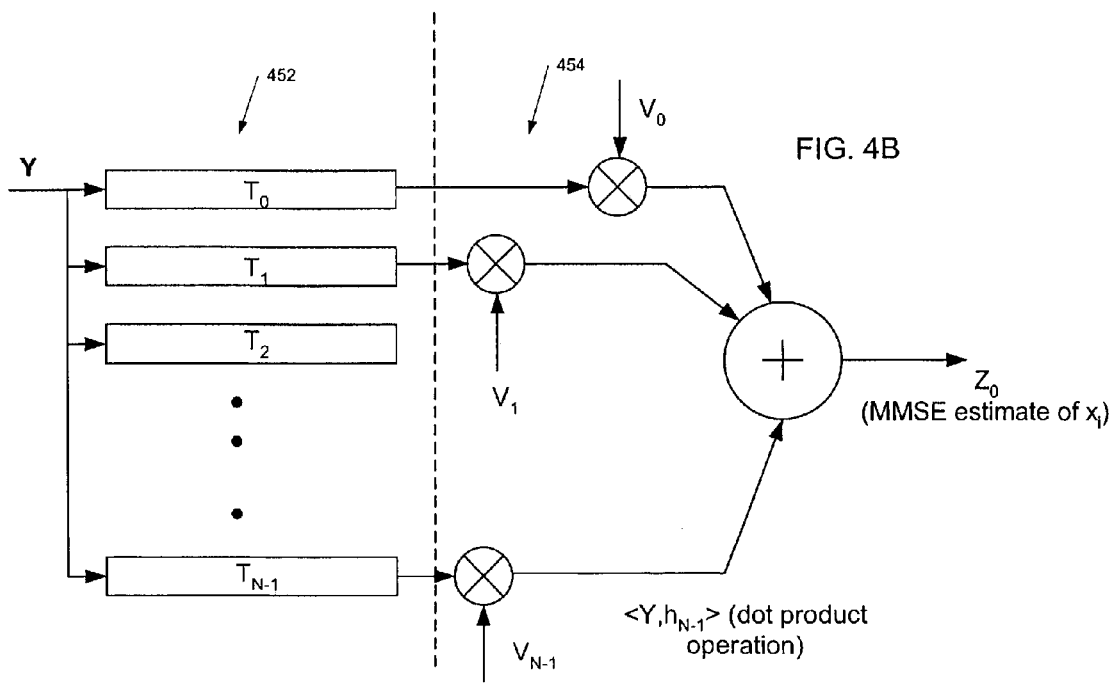
FIG. 4B is a block diagram schematically illustrating an MSNWF-CG estimator according to an embodiment of the invention.

The MSNWF filter configuration can be simplified even further if a MSNWF-Conjugate Gradient (MSNWF-CG) structure proposed in Zoltowski is employed. This MSNWF variant is depicted in FIG. 4B. As shown here, the simplified analysis section 402 is carried over from the MSNWF-COR configuration shown in FIG. 4A. However, a new synthesis section 454 is proposed that eliminates the need for recursion. The synthesis coefficients $V_0 \ldots V_{N-1}$ differ from, but are based on synthesis coefficients $W_0 \ldots W_{N-1}$ used in the base MSNWF and MSNWF-COR alternatives presented in FIGS. 3 and 4A respectively.

In order to better appreciate the benefits conferred by these embodiments, consider the following MT=4, MR=4, example such that $H=[h_0, h_1, h_2, h_3]$. Referring to the relationships stated above in equation (2), and without loss of generality assume that the sorted order for demodulating the layered data stream is $\{0,1,2,3\}$ in $0^{th}$ layer is demodulated first and so on. For the $0^{th}$ layer, the MMSE estimator is given by $$W_0 = [HH^H + \pi_n^2 I]^{-1} \cdot h_0^*, \quad (5)$$

where $H^H$ is the Hermitian (conjugate transpose) of H, and $h_0^*$ is the conjugate of $h_0$. Now consider $H_1 = H \backslash h_0$, $H_2 = H_1 \backslash_1$, $H_3 = H_2 \backslash h_2$. Then, $$W_1 = [H_1 H_1^H + \pi_n^2 I]^{-1} \cdot h_1^*, \quad (6)$$

$$W_2 = [H_2 H_2^H + \pi_n^2 I]^{-1} \cdot h_2^* \text{ and} \quad (7)$$

$$W_3 = [H_3 H_3^H + \pi_n^2 I]^{-1} \cdot h_3^* \quad (8)$$

represent the MMSE estimators to be used for the demodulation of layers 1, 2 and 3. One can now compute $W_0, W_1, W_2$ and $W_3$ without using matrix inversion by using e.g. Zoltowski's MSNWF-CG method. Here, I represents an MR×MR identity matrix. This results in an exact Layered-MMSE solution that is inversion free and with a computation complexity of $O(MR^3)$ rather than $O(MR^4)$ that conventional MMSE estimation would entail.

It should be noted that, of the three MSNWF alternative structures presented in FIGS. 3, 4A and 4B respectively, the MSNWF-CG alternative of FIG. 4B is believed to be the simplest to implement as an ASIC or in discrete logic. By contrast, the MSNWF alternative presented in FIG. 3 is believed to provide the most elegant solution if MSNWF approximation is to be implemented in software and/or firmware. In any case, these MSNWF alternatives provide a way to arrive at the MMSE solution without the need of computing any matrix inversions, although they do require multiplying a matrix with a column vector. All the numerical computations are simple and do not suffer from numerical instability problems as in the case of computing matrix inverses. As will be appreciated by those skilled in the art, any of these alternative MSNWF configurations may be interchangeably used to configure the MSNWF filters 1010, 1020, 1030 and 1040 shown in the canceller 920 (FIGS. 7 and 8) to perform the recovery of estimated component-symbols transmitted by a MIMO BLAST transmitter such as transmitter 805 shown in FIG. 6.

Figure 9:
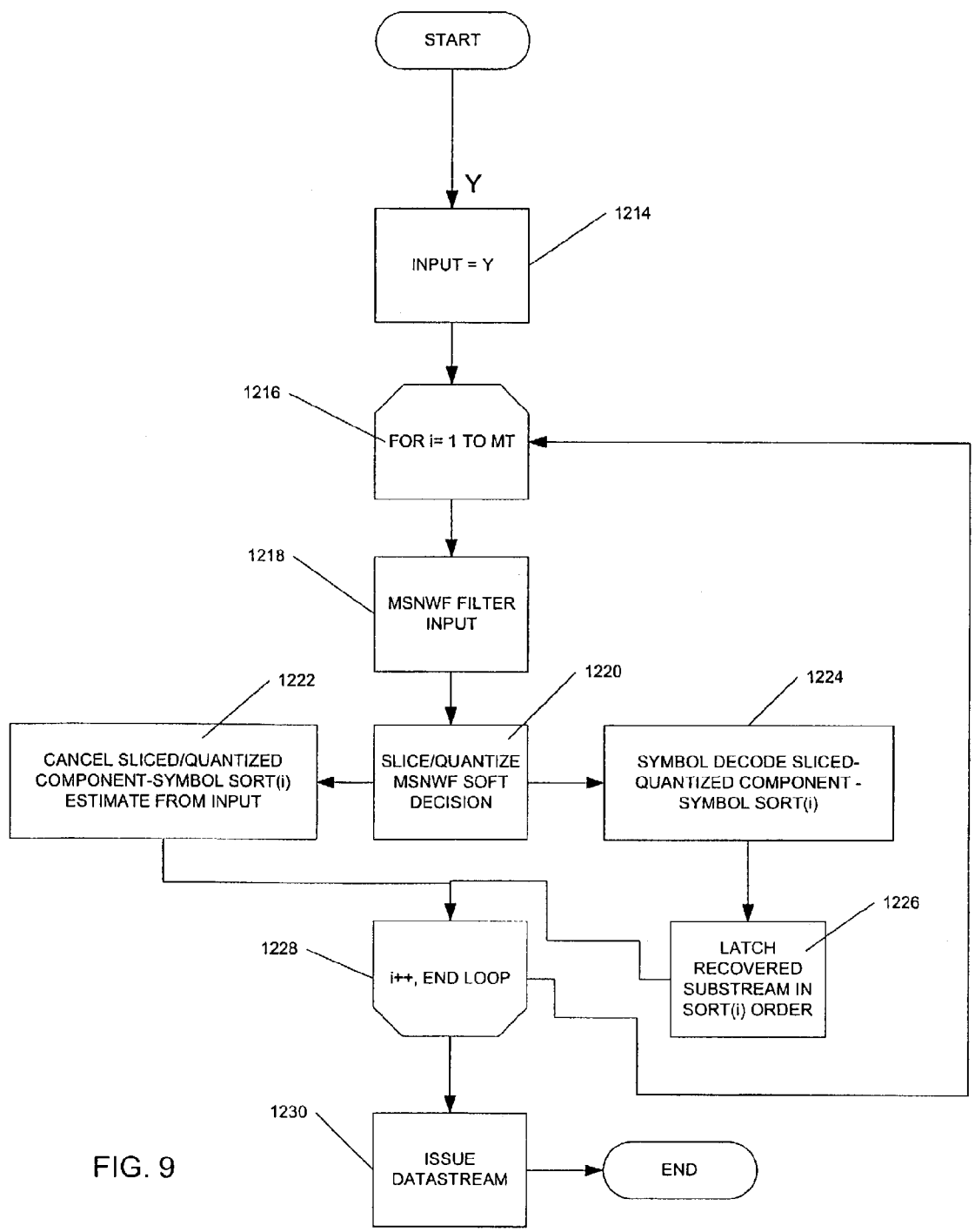
FIG. 9 is a flowchart illustrating successive interference cancellation according to another embodiment of the invention.

In another embodiment, one or more functions of the successive interference canceller 920, including the aforementioned MSNWF estimation, can be performed by one or more information processors programmed in accordance with the processing steps outlined in the flowchart of FIG. 9. Accordingly, the canceller 920 may be conveniently implemented in hardware, software or a combination thereof as long as the required estimation and interference cancellation functions can be undertaken within vector symbol transmission rate and timing requirements. Referring briefly to FIG. 9, it is assumed in this embodiment that initial channel estimation and component-symbol demodulation ordering consistent with the present invention has been performed, and both $\hat{H}$ and Sort(.) are available as inputs. Thus, component-symbol ordering and estimation/successive interference processing may be handled sequentially, since the Sort(.) in this case, being dependent on initial channel estimates, is deemed to be valid throughout the transmitted vector symbol burst. Though not shown in the figures, in other embodiments consistent with known V-BLAST ordering and component-symbol estimation processing flow, component-symbol ordering may be performed together with component-symbol estimation and interference cancellation in a staged recursive manner on a per component-symbol basis of each vector symbol, and may be useful where e.g. $\hat{H}$ is anticipated to change appreciably within a burst.

Moreover, steps 1222, 1220, and 1224 are shown in FIG. 9 being executed in a substantially parallel manner. However, consistent with the teachings of the present invention, no such parallelism is required and indeed the steps can be entirely sequentially executed as long as overall timing requirements can be observed.

The layered MSNWF structures previously discussed includes inner-product operations on ($M_R \times 1$) dimension vectors. The output of each MSNWF estimator, labeled as Z in the figures, can be written as:

$$Z = \Sigma_{i=1:MT} \beta_i \cdot \langle t_i, Y \rangle = \Sigma_{i=1:MT} \langle \beta_i t_i, Y \rangle \qquad (9)$$

Figure 5:
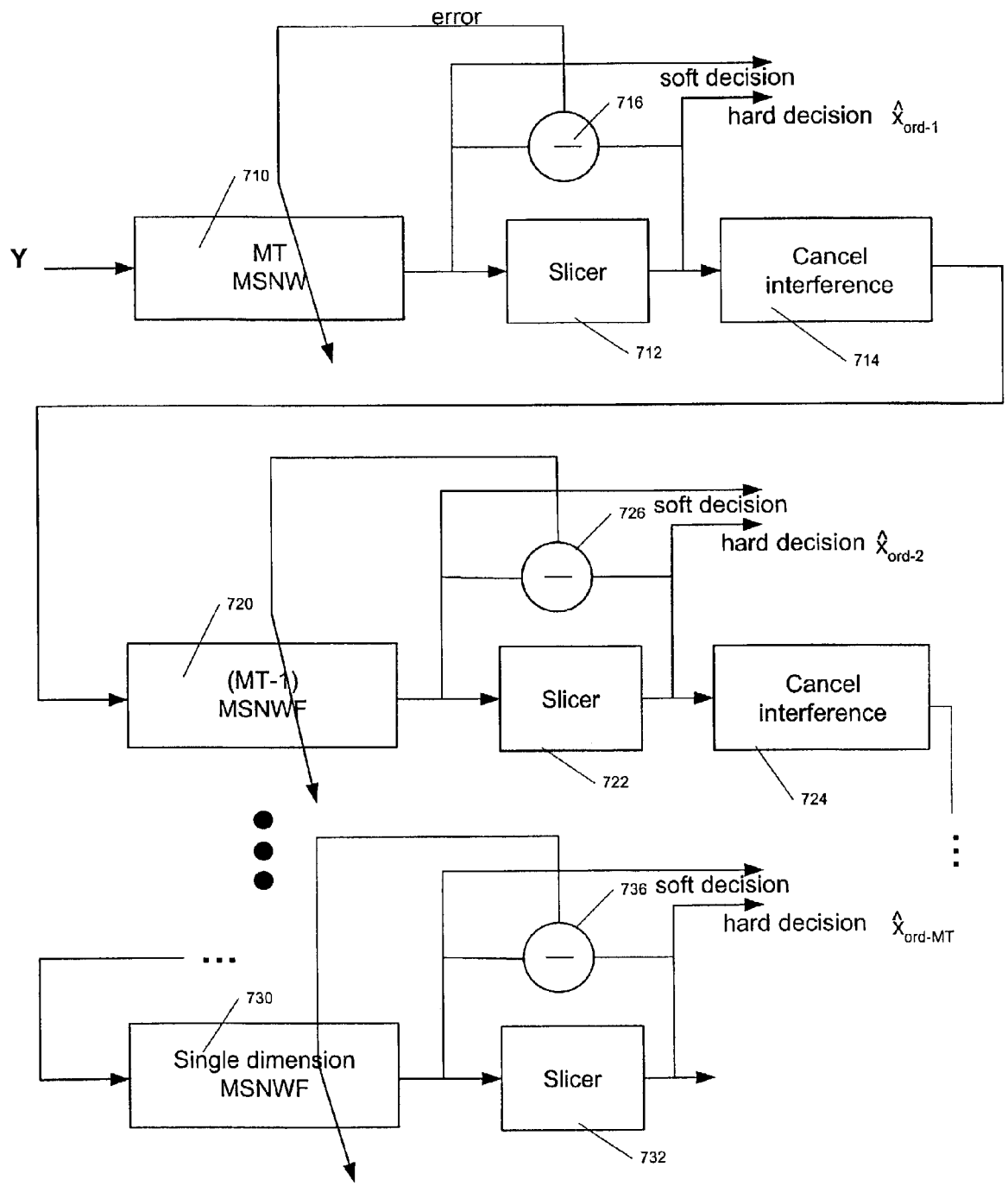
FIG. 5 is a block diagram schematically illustrating a successive interference canceller according to an embodiment of the invention.

FIG. 5 shows an adaptive variant of the configuration shown in FIG. 8 which utilizes the differences between the soft decisions generated by the MSNWF filters and the hard decisions rendered by the follow-up slicers to adaptively tailor the MSNWF filtering over time. The adaptation performed by the adaptation units 716, 726, and 736 can be blind, data-aided or decision-directed using any of the well-known techniques like least-mean-square (LMS) etc. The architecture can also be made completely adaptive or partially adaptive in which the higher order datastreams can be demodulated using the MSNWF-CG approximation of MMSE while the lower order estimators can be made adaptive.

It will be obvious to those having skill in the art that many changes may be made to the details of the above-described embodiments without departing from the underlying principles of the invention. The scope of the present invention should, therefore, be determined only by the following claims.

The invention claimed is:

1. A signal processor for use in a Bell Laboratories Layered Space-Time (BLAST) Multiple-Input Multiple Output (MIMO) receiver defining a receive antennas (MR) >1 element antenna array, comprising:

an ordering unit to generate a demodulation ordering based on a relative SNR analysis of an estimated channel matrix, wherein said ordering unit comprises a near-to-far resistance comparison unit that determines a near-to-far resistance for each member of at least a subset of the vectors forming the estimated channel matrix by projecting each member of the subset against an interfering sub-space corresponding to such member; and a successive interference canceller responsive to said ordering unit to estimate a transmitted signal vector on a per estimated component-symbol basis using successive Multi-staged Nested Weiner Filters (MSNWF) estimation and interference cancellation applied to a set of observed components in accordance with the demodulation ordering, each observed component comprising a random superposition of at least a subset of transmit antennas (MT) component-symbols forming the transmitted signal vector, wherein MT is >1 and MT<=MR.

2. The signal processor of claim 1, wherein the near-to-far resistance unit:
(B) modifies the demodulation order to include at least an identifier of the member of the subset having the relatively highest near-to-far resistance;
(C) removes the member from the subset having the relatively highest near-to-far resistance; and
(D) repeats (A)–(C) until the demodulation order is complete.

3. The signal processor of claim 1, wherein said successive interference canceller comprises an MT depth cascade of component-symbol estimation and cancellation units, each said component-symbol estimation units comprising an MSNWF estimator followed by a slicer and an interference cancellation unit.

4. The signal processor of claim 3, wherein said MSNWF estimator comprises one of an MSNWF-Covariance (MSNWF-COR) estimator and an MSNWF-Conjugate Gradient (MSNWF-CG) estimator.

5. The signal processor of claim 3, wherein at least one of said component-symbol estimation and cancellation units further comprises an error adaptation unit responsive to outputs of said MSNWF estimator and said slicer of said at least one component-symbol estimation and cancellation unit, said error adaptation unit communicating error adaptation information to a following one of said component-symbol estimation and cancellation units in said cascade.

6. The signal processor of claim 1, further comprising:
a symbol decoder responsive to said successive interference canceller to decode each estimated component-symbol forming the estimated transmitted signal vector; and
a multiplexor responsive to said symbol decoder and said ordering unit to recover an estimated datastream from the decoded estimated component-symbols in the demodulation order.

7. The signal processor of claim 1, wherein said ordering unit performs a V-BLAST relative SNR comparison among column vectors of the estimated channel matrix.

8. A signal processor for use in a BLAST MIMO receiver defining an MR>1 element antenna array, comprising:
an ordering unit to generate a demodulation ordering based on a near-to-far resistance comparison among vectors forming an estimated channel matrix, wherein said ordering unit comprises a near-to-far resistance comparison unit which (A) determines a near-to-far resistance for each member of at least a subset of the vectors forming the estimated channel matrix by projecting each member of the subset against an interfering sub-space corresponding to such member; and a successive interference canceller responsive to said ordering unit to estimate a transmitted signal vector on a per estimated component-symbol basis using successive estimation and interference cancellation applied to a set of observed components in accordance with the demodulation ordering, each observed component comprising a random superposition of at least a subset of MT component-symbols forming a transmitted signal vector, wherein MT is >1 and MT<=MR.

9. The signal processor of claim 8, wherein said near-to-far resistance comparison unit further:

(B) modifies the demodulation order to include at least an identifier of the member of the subset having the relatively highest near-to-far resistance;

(C) removes the member from the subset having the relatively highest near-to-far resistance; and (D) repeats (A)–(C) until the demodulation order is complete.

10. The signal processor of claim 9, wherein
said near-to-far resistance comparison unit modifies the demodulation order by appending an identifier of the member of the subset having the highest near-to-far resistance relative to the subset; and wherein said near-to-far resistance comparison unit repeats (A)–(C) continues until the subset has no more than one remaining member.

11. The signal processor of claim 8, wherein said estimation of said successive interference canceller comprises using at least one of zero-forcing, layered MMSE and MSNWF estimation.

12. A BLAST MIMO receiver, comprising:
an MR>1 element antenna array; and
a signal processor responsive to said antenna array and comprising:
an ordering unit to generate a demodulation ordering based on a relative SNR analysis of an estimated channel matrix, wherein said ordering unit comprises a near-to-far resistance comparison unit that (A) determines a near-to-far resistance for each member of at least a subset of the vectors forming the estimated channel matrix by projecting each member of the subset against an interfering sub-space corresponding to such member; and
a successive interference canceller responsive to said ordering unit to estimate a transmitted signal vector on a per estimated component-symbol basis using successive MSNWF estimation and interference cancellation applied to a set of observed components in accordance with the demodulation ordering, each observed component comprising a random superposition of at least a subset of MT component-symbols forming the transmitted signal vector, wherein MT is >1 and MT<=MR.

13. The receiver of claim 12, wherein the near-to-far resistance unit:

(B) modifies the demodulation order to include at least an identifier of the member of the subset having the relatively highest near-to-far resistance;

(C) removes the member from the subset having the relatively highest near-to-far resistance; and (D) repeats (A)–(C) until the demodulation order is complete.

14. The receiver of claim 12, wherein said successive interference canceller comprises an MT depth cascade of component-symbol estimation and cancellation units, each said component-symbol estimation units comprising an MSNWF estimator followed by a slicer and interference cancellation unit.

15. The receiver of claim 14, wherein said MSNWF estimator comprises one of an MSNWF-COR estimator and an MSNWF-CG estimator.

16. The receiver of claim 14, wherein at least one of said component-symbol estimation and cancellation units further comprises an error adaptation unit responsive to outputs of said MSNWF estimator and said slicer of said at least one component-symbol estimation and cancellation unit, said error adaptation unit communicating error adaptation information to a following one of said component-symbol estimation and cancellation units in said cascade.

17. The receiver of claim 12, further comprising:

a symbol decoder responsive to said successive interference canceller to decode each estimated component-symbol forming the estimated transmitted signal vector; and a multiplexor responsive to said symbol decoder and said ordering unit to recover an estimated datastream from the decoded estimated component-symbols in the demodulation order.

18. The receiver of claim 12, wherein said ordering unit performs a V-BLAST relative SNR comparison among column vectors of the estimated channel matrix.

19. A BLAST MIMO receiver, comprising:
an MR>1 element antenna array; and
a signal processor responsive to said antenna array and comprising:
an ordering unit to generate a demodulation ordering based on a near-to-far resistance comparison among vectors forming an estimated channel matrix, wherein said ordering unit comprises a near-to-far resistance comparison unit which (A) determines a near-to-far resistance for each member of at least a subset of the vectors forming the estimated channel matrix by projecting each member of the subset against an interfering sub-space corresponding to such member; and
a successive interference canceller responsive to said ordering unit to estimate a transmitted signal vector on a per estimated component-symbol basis using successive estimation and interference cancellation applied to a set of observed components in accordance with the demodulation ordering, each observed component comprising a random superposition of at least a subset of MT component-symbols forming a transmitted signal vector, wherein MT is >1 and MT<=MR.

20. The receiver of claim 19, wherein said near-to-far resistance comparison unit which:

(B) modifies the demodulation order to include at least an identifier of the member of the subset having the relatively highest near-to-far resistance;

(C) removes the member from the subset having the relatively highest near-to-far resistance; and (D) repeats (A)–(C) until the demodulation order is complete.

21. The receiver of claim 20, wherein
said near-to-far resistance comparison unit modifies the demodulation order by appending an identifier of the member of the subset having the highest near-to-far resistance relative to the subset; and wherein said near-to-far resistance comparison unit repeats (A)–(C) continues until the subset has no more than one remaining member.

22. The receiver of claim 19, wherein said estimation of said successive interference canceller comprises using at least one of zero-forcing, layered MMSE and MSNWF estimation.

23. A BLAST MIMO transceiver, comprising:
a BLAST transmitter; and
a BLAST receiver, comprising:
an MR>1 element antenna array; and
a signal processor responsive to said antenna array and comprising:
an ordering unit to generate a demodulation ordering based on a relative SNR analysis of an estimated channel matrix, wherein said ordering unit comprises a near-to-far resistance comparison unit which determines a near-to-far resistance for each member of at least a subset of the vectors forming the estimated channel matrix by projecting each member of the subset against an interfering sub-space corresponding to such member; and
a successive interference canceller responsive to said ordering unit to estimate a transmitted signal vector on a per estimated component-symbol basis using successive MSNWF estimation and interference cancellation applied to a set of observed components in accordance with the demodulation ordering, each observed component comprising a random superposition of at least a subset of MT component-symbols forming the transmitted signal vector, wherein MT is >1 and MT<=MR.

24. A BLAST MIMO transceiver, comprising:
a BLAST transmitter; and
a BLAST receiver, comprising:
an MR>1 element antenna array; and
a signal processor responsive to said antenna array and comprising:
an ordering unit to generate a demodulation ordering based on a near-to-far resistance comparison among vectors forming an estimated channel matrix, wherein said ordering unit comprises a near-to-far resistance comparison unit which determines a near-to-far resistance for each member of at least a subset of the vectors forming the estimated channel matrix by projecting each member of the subset against an interfering sub-space corresponding to such member; and
a successive interference canceller responsive to said ordering unit to estimate a transmitted signal vector on a per estimated component-symbol basis using successive estimation and interference cancellation applied to a set of observed components in accordance with the demodulation ordering, each observed component comprising a random superposition of at least a subset of MT component-symbols forming a transmitted signal vector, wherein MT is >1 and MT<=MR.

25. A signal processor for use in a BLAST MIMO receiver having an MR>1 element antenna array means, comprising:
means for generating a demodulation ordering based on a relative SNR analysis of an estimated channel matrix, wherein said generating means comprises means for comparing relative near-to-far resistance among vectors that A) determines a near-to-far resistance for each member of at least a subset of the vectors forming the estimated channel matrix by projecting each member of the subset against an interfering sub-space corresponding to such member; and
means for estimating a transmitted signal vector on a per estimated component-symbol basis using successive MSNWF estimation and interference cancellation applied to a set of observed components in accordance with the demodulation ordering, each observed component comprising a random superposition of at least a subset of MT component-symbols forming the transmitted signal vector, wherein MT is >1 and MT<=MR.

26. The signal processor of claim 25, wherein said comparing means further:
(B) modifies the demodulation order to include at least an identifier of the member of the subset having the relatively highest near-to-far resistance;
(C) removes the member from the subset having the relatively highest near-to-far resistance; and
(D) repeats (A)–(C) until the demodulation order is complete.

27. The signal processor of claim 25, wherein said estimating means comprises plural component-symbol estimation and cancellation means, each said component-symbol estimation means including MSNWF estimator means, slicer means and interference cancellation means.

28. The signal processor of claim 27, wherein said MSNWF estimator means comprises one of MSNWF-COR estimator means and MSNWF-CG estimator means.

29. The signal processor of claim 27, wherein at least one of said component-symbol estimation and cancellation means further comprises means for communicating error adaptation information to a following one of said component-symbol estimation and cancellation means.

30. The signal processor of claim 25, further comprising:
means for decoding each estimated component-symbol forming the estimated transmitted signal vector; and
means for recovering an estimated datastream from the decoded estimated component-symbols in the demodulation order.

31. The signal processor of claim 25, wherein said generating means comprises means for performing a V-BLAST relative SNR comparison among column vectors of the estimated channel matrix.

32. A signal processor for use in a BLAST MIMO receiver having an MR>1 element antenna array means, comprising:
means for generating a demodulation ordering based on a near-to-far resistance comparison among vectors forming an estimated channel matrix, wherein said generating means comprises near-to-far resistance comparison means which (A) determines a near-to-far resistance for each member of at least a subset of the vectors forming the estimated channel matrix by projecting each member of the subset against an interfering sub-space corresponding to such member; and
means for estimating a transmitted signal vector on a per estimated component-symbol basis using successive estimation and interference cancellation applied to a set of observed components in accordance with the demodulation ordering, each observed component comprising a random superposition of at least a subset of MT component-symbols forming a transmitted signal vector, wherein MT is >1 and MT<=MR.

33. The signal processor of claim 32, wherein said near-to-far resistance comparison means:
(B) modifies the demodulation order to include at least an identifier of the member of the subset having the relatively highest near-to-far resistance;
(C) removes the member from the subset having the relatively highest near-to-far resistance; and
(D) repeats (A)–(C) until the demodulation order is complete.

34. The signal processor of claim 33, wherein
said near-to-far resistance comparison means includes means for modifying the demodulation order by appending an identifier of the member of the subset having the highest near-to-far resistance relative to the subset; and wherein said near-to-far resistance comparison means repeats (A)–(C) until the subset has no more than one remaining member.

35. The signal processor of claim 32, wherein said estimating means includes using at least one of zero-forcing, layered MMSE and MSNWF estimation.

36. A BLAST MIMO receiver, comprising:
MR>1 element antenna array means; and
signal processor means, comprising:
means for generating a demodulation ordering based on a relative SNR analysis of an estimated channel matrix, wherein said generating means comprises means for comparing near-to-far resistance among vectors forming the estimated channel matrix that (A) determines a near-to-far resistance for each member of at least a subset of the vectors forming the estimated channel matrix by projecting each member of the subset against an interfering sub-space corresponding to such member; and
means for estimating a transmitted signal vector on a per estimated component-symbol basis using successive MSNWF estimation and interference cancellation applied to a set of observed components in accordance with the demodulation ordering, each observed component comprising a random superposition of at least a subset of MT component-symbols forming the transmitted signal vector, wherein MT is >1 and MT<=MR.

37. The receiver of claim 36, wherein said comparing means:
(B) modifies the demodulation order to include at least an identifier of the member of the subset having the relatively highest near-to-far resistance;
(C) removes the member from the subset having the relatively highest near-to-far resistance; and
(D) repeats (A)–(C) until the demodulation order is complete.

38. The receiver of claim 36, wherein said estimating means comprises plural component-symbol estimation and cancellation means, each said component-symbol estimation means comprising MSNWF estimator means, slicer means and interference cancellation means.

39. The receiver of claim 38, wherein said MSNWF estimator means comprises one of MSNWF-COR estimator means and MSNWF-CG estimator means.

40. The receiver of claim 38, wherein at least one of said component-symbol estimation and cancellation means further comprises means for communicating error adaptation information to a following one of said component-symbol estimation and cancellation means.

41. The receiver of claim 36, further comprising:
means for decoding each estimated component-symbol forming the estimated transmitted signal vector; and
means for recovering an estimated datastream from the decoded estimated component-symbols in the demodulation order.

42. The receiver of claim 36, wherein said generating means comprises means for performing a V-BLAST relative SNR comparison among column vectors of the estimated channel matrix.

43. A BLAST MIMO receiver, comprising:
MR>1 element antenna array means; and
signal processor means, comprising:
means for generating a demodulation ordering based on a near-to-far resistance comparison among vectors forming an estimated channel matrix, wherein said generating means comprises near-to-far resistance comparison means which (A) determines a near-to-far resistance for each member of at least a subset of the vectors forming the estimated channel matrix by projecting each member of the subset against an interfering sub-space corresponding to such member; and
means for estimating a transmitted signal vector on a per estimated component-symbol basis using successive estimation and interference cancellation applied to a set of observed components in accordance with the demodulation ordering, each observed component comprising a random superposition of at least a subset of MT component-symbols forming a transmitted signal vector, wherein MT is >1 and MT<=MR.

44. The receiver of claim 43, wherein said near-to-far resistance comparison means further:
(B) modifies the demodulation order to include at least an identifier of the member of the subset having the relatively highest near-to-far resistance;
(C) removes the member from the subset having the relatively highest near-to-far resistance; and
(D) repeats (A)–(C) until the demodulation order is complete.

45. The receiver of claim 44, wherein
said near-to-far resistance comparison unit modifies the demodulation order by appending an identifier of the member of the subset having the highest near-to-far resistance relative to the subset; and
wherein said near-to-far resistance comparison unit repeats (A)–(C) continues until the subset has no more than one remaining member.

46. The receiver of claim 43, wherein said estimating means includes using at least one of zero-forcing, layered MMSE and MSNWF estimation.

47. A BLAST MIMO transceiver, comprising:
BLAST transmission means; and
BLAST reception means, comprising:
MR>1 element antenna array means; and
signal processor means, comprising:
means for generating a demodulation ordering based on a relative SNR analysis of an estimated channel matrix, wherein said generating means comprises near-to-far resistance comparison means which determines a near-to-far resistance for each member of at least a subset of the vectors forming the estimated channel matrix by projecting each member of the subset against an interfering sub-space corresponding to such member; and
means for estimating a transmitted signal vector on a per estimated component-symbol basis using successive MSNWF estimation and interference cancellation applied to a set of observed components in accordance with the demodulation ordering, each observed component comprising a random superposition of at least a subset of MT component-symbols forming the transmitted signal vector, wherein MT is >1 and MT<=MR.

48. A BLAST MIMO transceiver, comprising:
BLAST transmission means; and
BLAST reception means, comprising:
MR>1 element antenna array means; and
signal processor means, comprising:
means for generating a demodulation ordering based on a near-to-far resistance comparison among vectors forming an estimated channel matrix, wherein said generating means comprises near-to-far resistance comparison means which determines a near-to-far resistance for each member of at least a subset of the vectors forming the estimated channel matrix by projecting each member of the subset against an interfering sub-space corresponding to such member; and means for estimating a transmitted signal vector on a per estimated component-symbol basis using successive estimation and interference cancellation applied to a set of observed components in accordance with the demodulation ordering, each observed component comprising a random superposition of at least a subset of MT component-symbols forming a transmitted signal vector, wherein MT is >1 and MT<=MR.

49. For use in a BLAST MIMO receiver having an MR>1 element antenna array, a signal processing method, comprising:

generating a demodulation ordering based on a relative SNR analysis of an estimated channel matrix, wherein said generating comprises comparing relative near-to-far resistance among vectors forming the estimated channel matrix, wherein said comparing comprises (A) determining a near-to-far resistance for each member of at least a subset of the vectors forming the estimated channel matrix by projecting each member of the subset against an interfering sub-space corresponding to such member; and estimating a transmitted signal vector on a per estimated component-symbol basis using successive MSNWF estimation and interference cancellation applied to a set of observed components in accordance with the demodulation ordering, each observed component comprising a random superposition of at least a subset of MT component-symbols forming the transmitted signal vector, wherein MT is >1 and MT<=MR.

50. The method of claim 49, wherein said comparing comprises:

(B) modifying the demodulation order to include at least an identifier of the member of the subset having the relatively highest near-to-far resistance;

(C) removing the member from the subset having the relatively highest near-to-far resistance; and (D) repeating (A)–(C) until the demodulation order is complete.

51. The method of claim 49, wherein said estimating comprises one of MSNWF-COR estimating and MSNWF-CG estimating.

52. The method of claim 49, further comprising:

decoding each estimated component-symbol forming the estimated transmitted signal vector; and recovering an estimated datastream from the decoded estimated component-symbols in the demodulation order.

53. The method of claim 49, wherein said generating comprises performing a V-BLAST relative SNR comparison among column vectors of the estimated channel matrix.

54. For use in a BLAST MIMO receiver having an MR>1 element antenna array, a signal processing method, comprising:

generating a demodulation ordering based on a near-to-far resistance comparison among vectors forming an estimated channel matrix, wherein said generating comprises near-to-far resistance comparison comprising (A) determining a near-to-far resistance for each member of at least a subset of the vectors forming the estimated channel matrix by projecting each member of the subset against an interfering sub-space corresponding to such member; and estimating a transmitted signal vector on a per estimated component-symbol basis using successive estimation and interference cancellation applied to a set of observed components in accordance with the demodulation ordering, each observed component comprising a random superposition of at least a subset of MT component-symbols forming a transmitted signal vector, wherein MT is >1 and MT<=MR.

55. The method of claim 54, wherein said near-to-far resistance comparison comprises:

(B) modifying the demodulation order to include at least an identifier of the member of the subset having the relatively highest near-to-far resistance;

(C) removing the member from the subset having the relatively highest near-to-far resistance; and (D) repeating (A)–(C) until the demodulation order is complete.

56. The method of claim 55, further comprising modifying the demodulation order by appending an identifier of the member of the subset having the highest near-to-far resistance relative to the subset; and wherein said near-to-far resistance comparing includes repeating (A)–(C) until the subset has no more than one remaining member.

57. The method of claim 54, wherein said estimating includes using at least one of a zero-forcing, layered MMSE and MSNWF estimation process.

58. A computer program product, comprising computer readable program code causing an information processor to perform the following steps in support of signal processing in a BLAST MIMO receiver having an MR>1 element antenna array, the steps comprising:

generating a demodulation ordering based on a relative SNR analysis of an estimated channel matrix, wherein said generating comprises near-to-far resistance comparison, comprising (A) determining a near-to-far resistance for each member of at least a subset of the vectors forming the estimated channel matrix by projecting each member of the subset against an interfering sub-space corresponding to such member; and estimating a transmitted signal vector on a per estimated component-symbol basis using successive MSNWF estimation and interference cancellation applied to a set of observed components in accordance with the demodulation ordering, each observed component comprising a random superposition of at least a subset of MT component-symbols forming the transmitted signal vector, wherein MT is >1 and MT<=MR.

59. A computer program product, comprising computer readable program code causing an information processor to perform the following steps in support of signal processing in a BLAST MIMO receiver having an MR>1 element antenna array, the steps comprising:

generating a demodulation ordering based on a near-to-far resistance comparison among vectors forming an estimated channel matrix, wherein said generating comprises near-to-far resistance comparison, comprising (A) determining a near-to-far resistance for each member of at least a subset of the vectors forming the estimated channel matrix by projecting each member of the subset against an interfering sub-space corresponding to such member; and estimating a transmitted signal vector on a per estimated component-symbol basis using successive estimation and interference cancellation applied to a set of observed components in accordance with the demodulation ordering, each observed component comprising a random superposition of at least a subset of MT component-symbols forming a transmitted signal vector, wherein MT is >1 and MT<=MR.

* * * * *

UNITED STATES PATENT AND TRADEMARK OFFICE
CERTIFICATE OF CORRECTION

PATENT NO. : 7,209,522 B1  Page 1 of 1
APPLICATION NO. : 10/388940
DATED : April 24, 2007
INVENTOR(S) : Kedar Shirali It is certified that error appears in the above-identified patent and that said Letters Patent is hereby corrected as shown below:

Column 2, Line 16    Delete "Foschini" and insert -- Foschini's --
Column 3, Line 16    Delete "been" after "has"
Column 3, Line 33    Delete "though" and insert -- through --
Column 3, Line 45    Delete "was revealed" after "solution"
Column 8, Line 31    Delete "Werner" and insert -- Weiner --
Column 8, Line 47    Insert -- $\hat{h}$ -- before "$_{Sort(3)}$"
Column 10, Line 31   Equation 5 – Delete "π" and insert -- σ --
Column 10, Line 36   Equation 6 – Delete "π" and insert -- σ --
Column 10, Line 38   Equation 7 – Delete "π" and insert -- σ --
Column 10, Line 40   Equation 8 – Delete "π" and insert -- σ --

Signed and Sealed this

Second Day of October, 2007

JON W. DUDAS
*Director of the United States Patent and Trademark Office*